3,287,424
METHOD OF FLUORINATING ORGANIC COMPOUNDS EMPLOYING ARSENIC TRIFLUORIDE
Harry A. Pacini, Richmond, Attila E. Pavlath, Berkeley, and Eugene G. Teach and Francis H. Walker, El Cerrito, Calif., assignors to Stauffer Chemical Company, New York, N.Y., a corporation of Delaware
No Drawing. Filed Sept. 25, 1963, Ser. No. 311,317
9 Claims. (Cl. 260—651)

This application is a continuation-in-part of our co-pending application Serial No. 54,816 filed September 9, 1960, now abandoned.

This invention relates to an improved method for the preparation of organic fluorine compounds by the replacement of all or part of the halogens in halogenated organic compounds. More specifically, the present improvements are directed to making fluorine-containing organic compounds from halogen-containing organic compound starting material, having at least one chlorine or bromine atom attached to an $sp^3$ hybrid carbon atom.

Three main processes have been used for the preparation of organic fluorine compounds; these are (1) the use of a metallic fluoride, (2) the use of hydrogen fluoride, and (3) the use of fluorine. While a large number of inorganic fluorides have been reported to effect the replacement of halogens in halogenated organic compounds, the principal fluorinating agents used are anhydrous hydrogen fluoride and the fluorides of antimony. Hydrogen fluoride is a low boiling corrosive liquid, which generally is used under pressure and its immiscibility with many organic compounds results in heterogeneous reactions. It is used either in conjunction with a metal salt or metal oxide to generate an active metal fluoride, for fluorinating organic halides.

The fluorides of antimony are the most important of the Group V metals. Antimony trifluoride is a high melting solid which is insoluble in most organic compounds and therefore gives heterogeneous reactions as does hydrogen fluoride. Antimony pentafluoride is an oily liquid with a melting point of 7° C. and boiling point of 149.5° C. Although less potent than hydrogen fluoride, antimony pentafluoride produces very vigorous reactions in which carbon-carbon cleavage can sometimes occur. Under certain conditions dehydrohalogenation can take place in which new double bonds are created. The use of antimony pentafluoride to introduce fluorine oftentimes is not efficient in that 1 mole of antimony pentafluoride is required per fluorine atom introduced. The use of pentavalent antimony chlorofluorides has been employed. These compounds are thermally unstable, forming chlorine and antimony trihalides. Since antimony trifluoride is much less effective as a fluorinating agent than pentavalent antimony chlorofluorides, it is desirable to use a temperature at which thermal decomposition is not appreciable.

The object of this invention is to prepare organic fluorine compounds without the difficulties encountered with hydrogen fluoride and the antimony fluorides. For this improved method the compound arsenic trifluoride is used in a mixture with at least one member selected from the group consisting of the pentavalent halides of antimony, niobium, tantalum and the arsenic chlorofluoro complex $[AsCl_4{}^+AsF_6{}^-]$. Arsenic trifluoride has previously been used for the preparation of phosphorous fluorides and silicon fluorides in inorganic chemistry by the replacement of halogens. The preparation of organic fluorine compounds with arsenic trifluoride has been reported in several cases. In one case, the reaction consisted of the fluorination of elementary carbon at 1100° C. in an electric arc to prepare carbon tetrafluoride and other compounds. This of course did not entail the replacement of other halogens by fluorine. In another case, arsenic trifluoride was used to prepare certain acyl fluorides from the corresponding acyl chloride.

Arsenic trifluoride is a colorless mobile liquid having a boiling point of 63° C. and many of the replacements reported herein may be carried out at this temperature or below. It is miscible with many organic solvents and it is itself a solvent for many organic compounds. This allows arsenic trifluoride to be used in homogeneous reactions in contrast with hydrogen fluoride and the antimony fluorides.

According to the present invention arsenic trifluoride is used in a mixture, wherein at least one member is selected from the group consisting of pentavalent halides of antimony, niobium, tantalum and the arsenic chlorofluoro complex $[AsCl_4{}^+AsF_6{}^-]$, to fluorinate halogenated organic compounds wherein the said halogen is either bromine or chlorine which is attached to an $sp^3$ hybrid carbon atom. The above mentioned mixture shall hereinafter be referred to as fluorinating agent. Typical nonlimiting examples which contain $sp^3$ hybrid carbon atoms are chlorinated or brominated alkanes, olefins, ketones and acid derivatives, as well as aromatic compounds containing halogenated side chains.

In the embodiment of the present invention the halogen exchange reaction is carried out between said fluorinating agent and a halogenated compound. Arsenic trifluoride used alone does not give a satisfactory fluorination by halogen exchange except in the case of acyl halides. However, the replacement of halogen in acyl halides also can be carried out easily with any number of previously known reactions utilizing other inorganic fluorides, such as thallous fluoride, zinc fluoride, silver fluoride and potassium fluorosulfonate. In the embodiment of the present invention the preferred reagents to be used with arsenic trifluoride are selected from the group consisting of pentavalent antimony halides, pentavalent niobium halides, pentavalent tantalum halides, the complex $[AsCl_4{}^+AsF_6{}^-]$ and the like.

The reaction is conducted under substantially anhydrous conditions in either glass or resistant metal apparatus. Contact with moisture causes the formation of hydrogen fluoride. Generally, atmospheric pressure is used. However, the reaction may be carried out at superatmospheric pressures.

The temperature of the reaction is kept as low as operability permits and preferably lies between 20° C. to 250° C. During the reaction period the contents of the reaction vessel are preferably mixed, for example, by mechanical stirring or shaking.

The ratio in which the reactants are used is not critical, but for maximum yield the arsenic trifluoride should be employed in at least the stoichiometric quantity, and preferably is employed in excess of this quantity. Generally the amount of pentavalent antimony, niobium, tantalum halide or the arsenic chlorofluoro complex

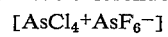

used was 5–10 mole percent per mole of arsenic trifluoride used. However, lesser or greater amounts may be used and still obtain the desired results. An excess of arsenic trifluoride may be employed as a solvent, or an aromatic hydrocarbon such as benzene, toluene, xylene or the like may be used.

The halogenated organic compound to be fluorinated by the fluorinating agent herein described needs to contain halogen, either bromine or chlorine, which is attached to an $sp^3$ hybrid carbon atom. The following observations of halogen exchange can be made, using the fluorinating agent, arsenic trifluoride/pentavalent antimony halide: the —$CCl_3$ group is the most reactive, the —$CCl_2$— group is next reactive, the —$CHCl_2$ group is converted slowly to fluorine containing group, and the —CH₂Cl group with great difficulty can be converted to —CH₂F.

The following examples illustrate the preferred embodiments of the present invention.

Example 1

To a stirred mixture of 66 g. of arsenic trifluoride and 3 ml. of antimony pentachloride, 81 g. of carbon tetrachloride was added dropwise at room temperature. Immediate gas evolution started and the gases were collected in a Dry Ice-acetone trap. After the addition of the carbon tetrachloride the mixture was heated for an hour under mild reflux. In the trap 58 g. of low boiling liquid was collected. The analysis showed 63.7% trichlorofluoromethane and 36.3% dichlorodifluoromethane as its composition.

Example 2

A mixture of 33 g. of arsenic trifluoride and 1.5 ml. SbCl₅ was fed simultaneously together with 40 g. of carbon tetrachloride into a vertical quartz tube at 210° C. The tube was filled with carbon chunks. The product was trapped as in Example 1. No product was obtained boiling under room temperature. The fractionation of the mixture resulted in 14 g. of trichlorofluoromethane (B.P. 26–30° C.) and the rest was unreacted carbon tetrachloride.

Example 3

A mixture of 125 ml. arsenic trifluoride and 10 ml. of SbF₅ was reacted with 133 g. of methyl chloroform at 45–50° C. in a tube reactor filled with helices. AsF₃/SbCl₅ mixture was introduced at the top of the reactor, while the methyl chloroform was added at a point two-thirds of the height of the reactor to insure complete fluorination. The gases obtained in the reaction were purified through a cold trap system and 63 g. of low boiling liquid was obtained in Dry Ice-acetone trap. The product was identified by its I.R. spectrum and molecular weight as methylfluoroform. M.W.; calc. 84.04. Found 85.1.

Example 4

67 g. of methyl chloroform and 110 g. of arsenic trifluoride were mixed and 3 ml. of SbCl₅ was added dropwise under stirring and gentle refluxing. The escaping gases were trapped in a Dry Ice-acetone trap. 32 g. of liquid boiling under room temperature was collected. Analysis showed 54% CF₃CH₃ and 46% CF₂ClCH₃.

Example 5

A solution of 8 g. SbF₃Cl₂ in 55 g. of arsenic trifluoride was added to 59.5 g. 1,1,1,2,2,3,3-heptachloropropane. The mixture was kept in reflux under stirring for four hours, then it was washed with water, dried by CaCl₂ and fractionated at 29 Hg mm. A fraction boiling at 78–91° C. weighed 13 g. and was identified as difluoropentachloropropane, while a second fraction boiling at 102–107° C. weighed 28 g., was identified as monofluorohexachloropropane. The rest was unreacted starting material.

Example 6

In a stirring autoclave of 1 liter capacity 265 g. of arsenic trifluoride, 15 ml. of antimony pentachloride and 170 g. of heptachloropropane were added and heated for 6 hours at 150° C. After working up the reaction mixture in the same way as described in Example 5, in addition to the fluorinated products mentioned there, 47 g. of trifluorotetrachloropropane was obtained boiling at 25 Hg mm. between 29–36° C.

Example 7

Into a stirred solution of 20 ml. of SbCl₅ in 396 g. of arsenic trifluoride, 500 g. of hexachloropropene was added dropwise. An exothermic reaction took place and the mixture refluxed gently during the addition. After the addition was complete the mixture was heated for 5 hours. Then the mixture was washed with 1:1 HCl, water, NaHCO₃ solution and again water. After drying with CaCl₂ it was fractionated and 323 g. of 1,1,1-trifluoro-2,3,3-trichloro-propene-2 was obtained boiling between 88.5–88.9° C.

Example 8

A mixture of 50 g. of hexachloroacetone, 60 g. of arsenic trifluoride and 2 ml. of SbCl₅ were placed in a flask and refluxed for 5 hours with stirring. Two layers remained during the reaction. The upper layer was separated and worked up in the usual way. The crude material weighed 40.5 g. Its composition according to the analysis was: 22% difluorotetrachloroacetone, 66% monofluoropentachloroacetone and 22% unreacted starting material.

Example 9

Trichloroacetylchloride (45.5 g.) was added dropwise with stirring to 52.8 g. of arsenic trifluoride containing 1 ml. of SbCl₅ at the reflux temperature of the mixture. After 3 hours of reflux the reaction mixture was worked up by fractional distillation. Two major components were obtained: unreacted starting material and 28 g. of trichloroacetylfluoride (B.P. 50–51° C.). A low boiling liquid (dichloromonofluoroacetylfluoride 5.5 g.) was isolated also.

Example 10

Into the mixture of 15 g. of arsenic trifluoride and 0.5 ml. of SbCl₅, 7.5 g. of CH₂(CCl₂CN)₂ was added and the solution was heated for 2 hours. The reaction mixture was poured into ice-water and a solid separated. Analysis showed it to be monofluorotrichloroglutaronitrile contaminated with partially hydrolyzed products such as amides and acids. Fluorine calculated: 8.25%. Found, 7.82%.

Example 11

Benzotrichloride (19.5 g.) was mixed with 20 g. of arsenic trifluoride and 1 ml. of SbCl₅. The mixture was refluxed for 2 hours, then it was washed with water and dried with CaCl₂. After fractionation 6.2 g. of benzotrifluoride (B.P. 103–106° C.) and 7.2 g. of benzodifluoromonochloride (B.P. 135–140° C.) was obtained.

Example 12

Into a solution of 33 g. of arsenic trifluoride and 1.5 ml. of SbCl₅, 31.4 g. of hexachloro-p-xylene was added. After a short exothermic reaction the reaction mixture was heated for one hour and worked up in the usual way. The fractionation resulted in 21 g. of colorless liquid at 31° C./34 Hg mm. According to its analysis it is composed of two products: 74% pentafluorochloro-p-xylene and 26% of hexafluoro-p-xylene.

Example 13

Using the same procedure as described in Example 12, niobium pentachloride was used in place of antimony pentachloride with arsenic trifluoride for the fluorination of hexachloro-p-xylene. After mixing the reactants, the mixture could be heated to reflux without violent reaction. Analysis by gas liquid partition chromatography showed a trace of hexafluoro-p-xylene, 12% pentafluoromonochloro-p-xylene, 45% tetrafluorodichloro-p-xylene and 42% trifluorotrichloro-p-xylene, and a trace of difluorotetrachloro-p-xylene.

Example 14

Likewise, in using tantalum pentachloride with arsenic trifluoride as the fluorinating mixture of hexachloro-p-xylene, the major products as analyzed by gas chromatography were 30% trifluorotrichloro-p-xylene and 43% difluorotetrachloro-p-xylene. The remaining 27% is made up of small amounts of the tetrafluoro-p-xylene and monofluoro-p-xylene with a trace of pentafluoro-p-xylene.

*Example 15*

A mixture of arsenic trifluoride containing 5.7% of the arsenic fluorochloro complex [AsCl$_4^+$AsF$_6^-$] was reacted with hexachloro-p-xylene. The reactants were heated gently. Some heat was evolved. The product after work up by washing with water, HCl and NaHCO$_3$ was examined by gas chromatography. It was found to contain 24% tetrafluorodichloro-p-xylene, 57% pentafluoromonochloro-p-xylene and 18% hexafluoro-p-xylene.

The foregoing examples illustrate the requirement of the presence of at least one member selected from the group consisting of the pentavalent halides of antimony, niobium, tantalum or the arsenic chlorofluoro complex [AsCl$_4^+$AsF$_6^-$] in order to obtain improved yields when using arsenic trifluoride in fluorination reactions.

Various changes and modifications may be made in the method described herein as will be apparent to those skilled in the chemical arts. It is accordingly intended that the present invention shall only be limited by the scope of the appended claims.

We claim:

1. The process for replacing at least one halogen atom in an organic compound selected from the group consisting of bromine and chlorine with a fluorine atom to produce fluorine-containing compounds comprising reacting under substantially anhydrous conditions organic compounds containing 1 to 6 sp$^3$ hybrid carbon atoms, inclusive, having said halogen atoms bonded to at least one of said carbon atoms, with a mixture consisting of at least a stoichiometric quantity of arsenic trifluoride and a catalytic amount of at least one member selected from the group consisting of antimony pentahalide, niobium pentahalide, tantalum pentahalide and arsenic chlorofluoro complex [AsCl$_4^+$AsF$^-$] at temperatures between about 20° C. and about 250° C. and recovering the fluorine-containing organic compound produced thereby.

2. The process of claim 1 wherein the organic compound is a haloalkane.

3. The process of claim 1 wherein the organic compound is a haloolefin.

4. The process of claim 1 wherein the organic compound is a haloketone.

5. The process of claim 1 wherein the organic compound is an aromatic compound containing halogenated side chains.

6. The process of making a fluorinated methane comprising reacting carbon tetrachloride with a mixture consisting of at least a stoichiometric quantity of arsenic trifluoride and a catalytic amount of at least one member selected from the group consisting of antimony pentahalide, niobium pentahalide, tantalum pentahalide and arsenic chlorofluoro complex [AsCl$_4^+$AsF$_6^-$] at temperatures between about 20° C. and about 250° C. under substantially anhydrous conditions.

7. The process of making methylfluoroform comprising reacting methyl chloroform with a mixture consisting of at least a stoichiometric quantity of arsenic trifluoride and a catalytic amount of at least one member selected from the group consisting of antimony pentahalide, niobium pentahalide, tantalum pentahalide and arsenic chlorofluoro complex [AsCl$_4^+$AsF$_6^-$] at temperatures between 20° C. and about 250° C. under substantially anhydrous conditions.

8. The process of making a benzo fluoride comprising reacting benzotrichloride with a mixture consisting of at least a stoichiometric quantity of arsenic trifluoride and a catalytic amount of at least one member selected from the group consisting of antimony pentahalide, niobium pentahalide, tantalum pentahalide and arsenic chlorofluoro complex [AsCl$_4^+$AsF$_6^-$] at temperatures between about 20° C. and about 250° C. under substantially anhydrous conditions.

9. The process of making a fluorinated xylene comprising reacting a bis(trichloromethyl) benzene with a mixture consisting of at least a stoichiometric quantity of arsenic trifluoride and a catalytic amount of at least one member selected from the group consisting of antimony pentahalide, niobium pentahalide, tantalum pentahalide and arsenic chlorofluoro complex [AsCl$_4^+$AsF$_6^-$] at temperatures between about 20° C. and about 250° C. under substantially anhydrous conditions.

References Cited by the Examiner
UNITED STATES PATENTS

| | | | |
|---|---|---|---|
| 2,499,833 | 3/1950 | Perkins | 260—653.8 |
| 2,549,988 | 4/1951 | Perkins | 260—653.8 |
| 2,757,214 | 7/1956 | Muetterties | 260—544 |
| 2,927,948 | 3/1960 | Schere et al. | 260—653.7 |

LEON ZITVER, *Primary Examiner.*

LORRAINE A. WEINBERGER, DANIEL D. HOROWITZ, *Examiners.*

R. K. JACKSON, *Assistant Examiner.*